United States Patent [19]
Meares, Jr.

[11] Patent Number: 5,272,465
[45] Date of Patent: Dec. 21, 1993

[54] AUTOMATIC ALARM CODE CONVERTER

[75] Inventor: Douglas L. Meares, Jr., Raleigh, N.C.

[73] Assignee: Telemessaging Devices, Inc., Raleigh, N.C.

[21] Appl. No.: 791,154

[22] Filed: Nov. 13, 1991

[51] Int. Cl.⁵ .................. G08B 1/08; H04M 11/04
[52] U.S. Cl. .................. 340/539; 340/531; 340/311.1; 340/825.44; 340/534; 379/40; 379/49; 379/51; 379/57
[58] Field of Search .......... 340/539, 311.1, 825.44, 340/825.47, 531, 534, 825.36, 825.49; 379/142, 57, 40, 49, 51

[56] References Cited
U.S. PATENT DOCUMENTS

| | | | |
|---|---|---|---|
| 4,692,742 | 9/1987 | Raizen et al. | 340/539 |
| 4,766,434 | 8/1988 | Matai et al. | 340/311.1 |
| 4,856,047 | 8/1989 | Saunders | 340/825.44 |
| 4,926,460 | 5/1990 | Gutman et al. | 340/825.48 |
| 4,959,644 | 9/1990 | Sato | 340/311.1 |
| 5,010,317 | 4/1991 | Schwendeman et al. | 340/311.1 |

Primary Examiner—Donnie L. Crosland
Attorney, Agent, or Firm—John G. Mills and Associates

[57] ABSTRACT

An automatic alarm code converter wherein a plurality of alarm dialers report alarm conditions using security industry standard pulsed tone, FSK, or DTMF formats and call through the PSTN to the converter. The converter comprises a telephone line interface/decoder, a microprocessor which correlates the received alarm ID and code with addresses in a page data memory. The page data memory contains a pager number and an associated alphanumeric ASCII message The code converter further comprises a software program embodied in an EPROM which instructs on the automatic formatting of the page data into the PET/TAP protocol. The code converter communicates the page data to the paging system through a full duplex serial port either by direct RS232 connection or remotely through a dial-out modem using the PET/TAP protocol.

4 Claims, 6 Drawing Sheets

AUTOMATIC ALARM CODE CONVERTER

BACKGROUND OF INVENTION

This invention is in the fields of both alarm reporting and radio paging. This invention is designed to combine the best features and advantages of both security dialers and the most modern form of text messaging called alphanumeric paging Security dialers have been in use for many years previous to this time and have been developed to be inexpensive and reliable Security dialers communicate using pulsed tones, FSK, or DTMF and are designed to communicate their alarm reports to central monitoring stations having specialized telephone line receivers which answer the dialers and decode the alarm codes and dialer ID. Security dialers are not capable of communicating alphanumeric messages to paging terminals because the paging industry has standardized on a different format for communicating alphanumeric message entry. The paging industry adopted the Motorola PET protocol for entering alphanumeric messages into a paging terminal. The PET protocol is a specially formatted ASCII communications which uses a full duplex serial or modem port on a paging terminal. The PET protocol was first implemented in the paging industry in 1984. By 1989, the paging industry had completely standardized on the PET protocol. The Spokes organization for the paging industry, Telocator, henceforth referred to the PET protocol (Motorola's name for it) as TAP, which is short for Telocator Alphanumeric Protocol.

The purpose of this invention is to permit the use of relatively simple and inexpensive dialers to replace traditional type PET/TAP entry devices Typically, the PET/TAP entry devices, by design, are relatively complex and expensive due to the requirements that they store messages internally and communicate those messages using an auto dial modem to communicate an alphanumeric messages automatically to a paging terminal. Another difficulty posed by the traditional PET/TAP entry devices is the complex programming required by the operator to enter messages into the entry devices. The dialers used to communicate with this invention do not require or user programming.

This invention is a code protocol converter which is designed to receive calls from the simpler and inexpensive security dialers and to convert the alarm report into an alphanumeric message to be sent to a pager by using PET/TAP protocol. The net result of this invention will be to lessen the cost and complexity of monitor/dialers to the end user, while still providing the advantage of the more sophisticated alphanumeric paging format for alarm monitoring.

When the security dialers detect an alarm condition, they dial through the public switched telephone network (PSTN) to the Protocol Converter. The converter answers the call, communicates in the security industry protocol of the dialer and then looks up in memory the corresponding pager and message information and converts the information into PET/TAP protocol for communication to the paging terminal's alpha port. The paging system then transmits the page digitally to the proper pager or pagers which display the alphanumeric message (up to 80 characters).

SUMMARY OF INVENTION

A code protocol converter capable of receiving and decoding alarm reports from a plurality of security dialers, each, with a plurality of sensor inputs and codes. All dialers communicate with the convert by dialing through either a PABX or the PSTN. The converter comprises a security telephone interface/decoder, which answers report calls from the dialers and decodes the dialer ID and alarm code. The converter also comprises a microprocessor with a memory system which correlates the decoded dialer ID and alarm code with pager data and alphanumeric messages stored in the memory system. The pager number and alphanumeric message are formatted into PET/TAP protocol for communication to a paging system through a serial RS232 port or dial-out modem. The converter communicates in full duplex with the PET/TAP serial or modem port on the paging system.

The chief advantage that this invention offers over any other, is that the Protocol Converter permits the end user to use a simple and inexpensive security dialer(s) to automatically send alarm messages to the more sophisticated alphanumeric display pagers. Alphanumeric display pagers are advantageous over other types of pagers in that full detailed text messages regarding an alarm condition can be displayed and stored in the pager memory. A visual display of a detailed message eliminates problems of noisy environments causing voice messages to not be understood. The alphanumeric pager has the advantage over the numeric display pager of being able to give a full detailed message rather than a numeric code.

DISCUSSION OF PRIOR ART

U.S. Pat. No. 4,692,742 issued September 1987 to Raizen discloses an alarm system in which security dialers call a computer interface and the computer signals two tone voice pagers to give a synthetic voice alarm message. This invention differs from the present invention in that the alarm message is sent, using a two tone and voice signaling protocol, an analog transmission. The present invention converts the dialer reports into PET/TAP protocol, which is a serial ASCII full duplex "open domain" protocol for alphanumeric messaging, and then the paging system sends the converted message using a digital transmission.

U.S. Pat. No. 4,856,047 issued August 1989 to Saunders discloses an alarm reporting dialer designed to send a numeric alarm code to a numeric pager. This invention differs from the present invention in that it communicates with the paging system using a DTMF protocol through conventional input trunks on a paging terminal. This invention cannot communicate in PET/TAP protocol and therefore cannot send alphanumeric messages.

U.S. Pat. No. 4,926,460 issued May 1990 to Gutman, Goldberg and Trine discloses a paging entry system capable of accepting human originated phone pages or computer originated alphanumeric pages. This invention differs from the present invention in that it does not have an input for a security receiver/decoder, nor does it automatically convert the ID/code format of security dialers into PET/TAP protocol and then automatically send the converted message to the paging system.

BRIEF DESCRIPTION OF THE DRAWINGS

FIG. 1 also shows how the invention interfaces to a paging system alphanumeric input port either through direct serial port connection or by dial up modem and communicates alphanumeric page data using the PET/TAP protocol.

DESCRIPTION OF THE PREFERRED EMBODIMENTS

Figure 1:
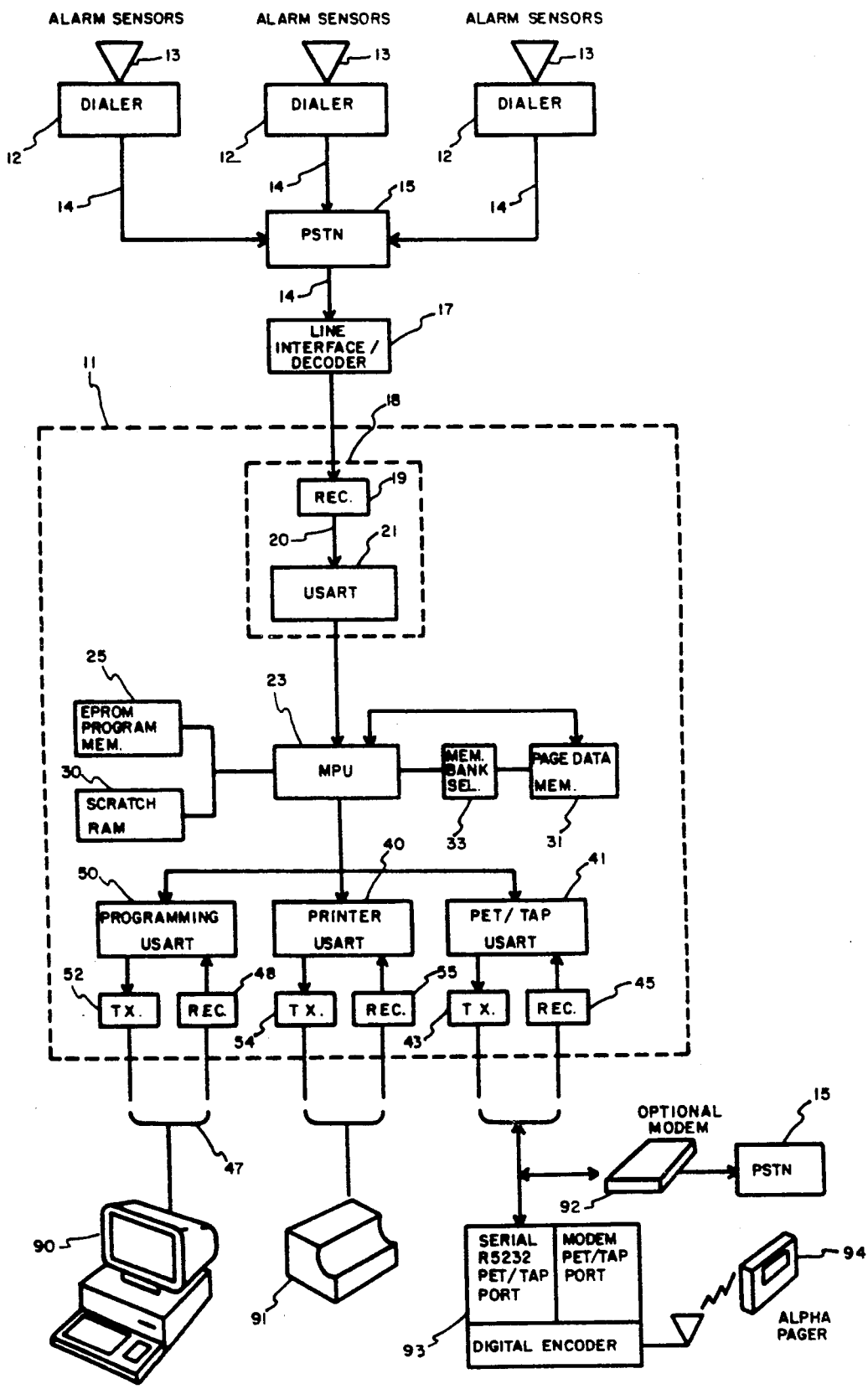
FIG. 1 is a diagram showing how the invention interfaces with incoming message protocols from alarm dialers which call through a telephone line.

FIG. 1 shows how the invention 11 (Protocol Converter) interfaces with alarm dialers 12, which monitor normally open, closed or voltage alarm conditions 13. When an alarm condition 13 occurs the dialers 12 dial through either a PABX or telephone line 14 through the PSTN 15. The PSTN 15 routes the call to the Line Interface/Decoder 17 (Adcor CDR-50C or equivalent). The Line Interface/Decoder 17 answers the call and communicates with the calling dialer 12 using a standard security tone signaling protocol (Ademco, Sescoa, or Franklin 3+1, Silent Knight 4+2, Silent Knight FSK, Radionics Hex, Westec 3+1 Extended, or Ademco an Acron DTMF). The Interface/Decoder 17 converts the ID and alarm tone codes into a three or four digital ID and a one or two digit alarm code which are output in ASCII serial format through an RS232 port to the alarm RS232 serial input port 18 on the invention.

Figure 2:
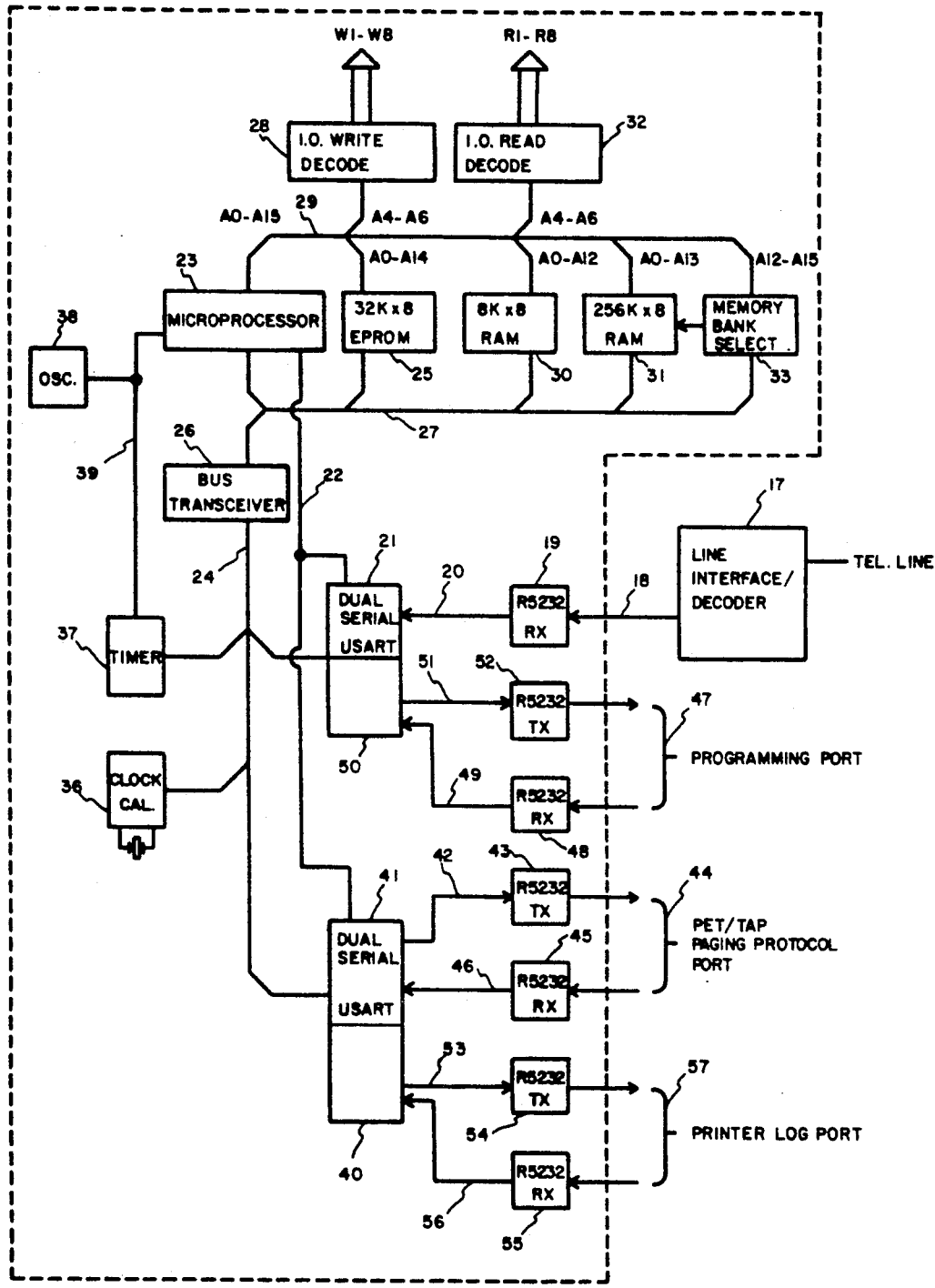
FIG. 2 is a diagram of the invention showing the circuits comprising the alarm line interface/decoder, alarm input, the processor for correlating alarm code data with page data memory, and serial communications ports for PET/TAP protocol, operator programming and alarm logging.
Figure 3:
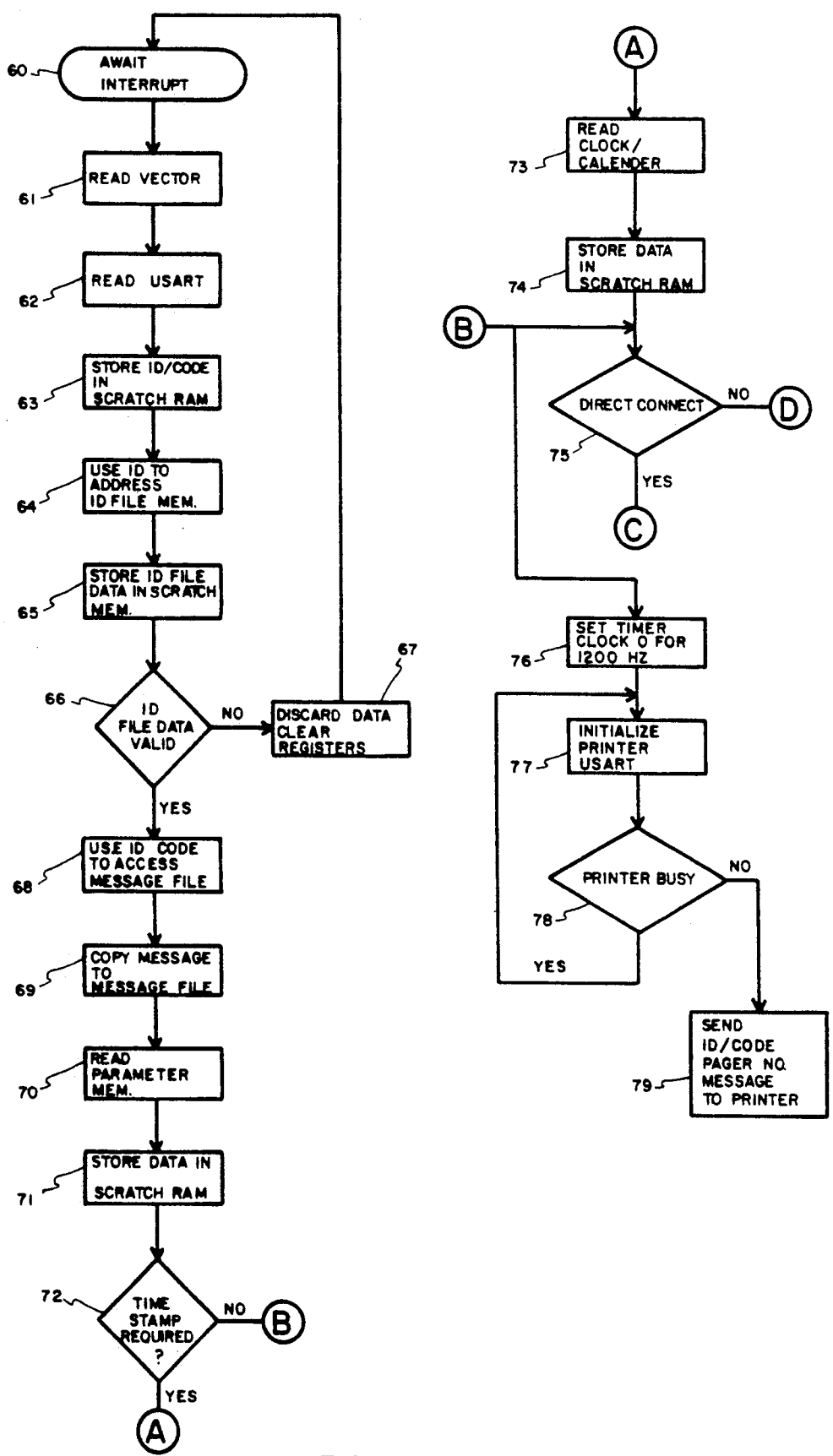
FIG. 3 is a flow chart of the invention protocol conversion process showing how the alarm code input protocol is used to access pager data memory, format the page data or PET/TAP protocol, and communicates the message to the PET/TAP port on a paging system and log the message to a printer.
Figure 4:
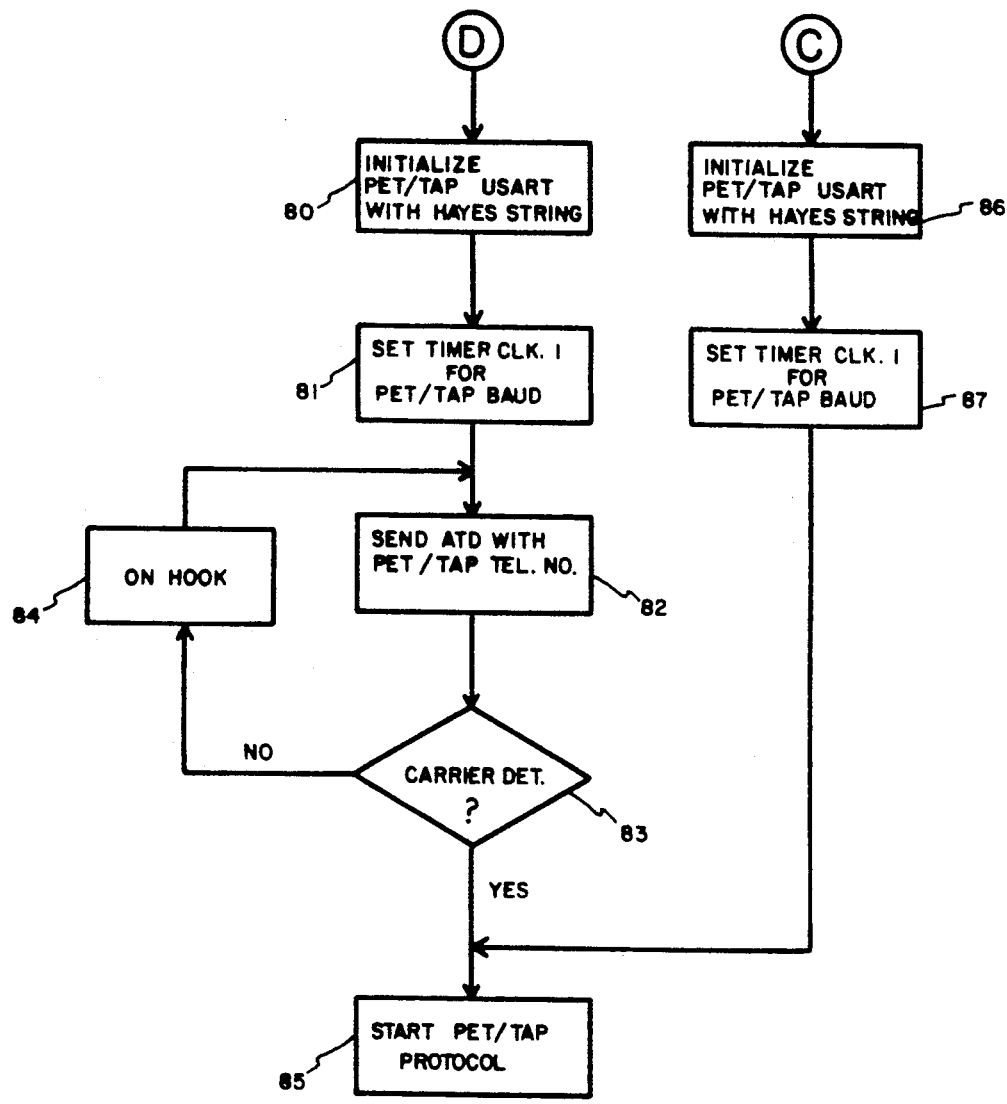
FIG. 4 is a continuation of the invention protocol conversion process flow.
Figure 5:
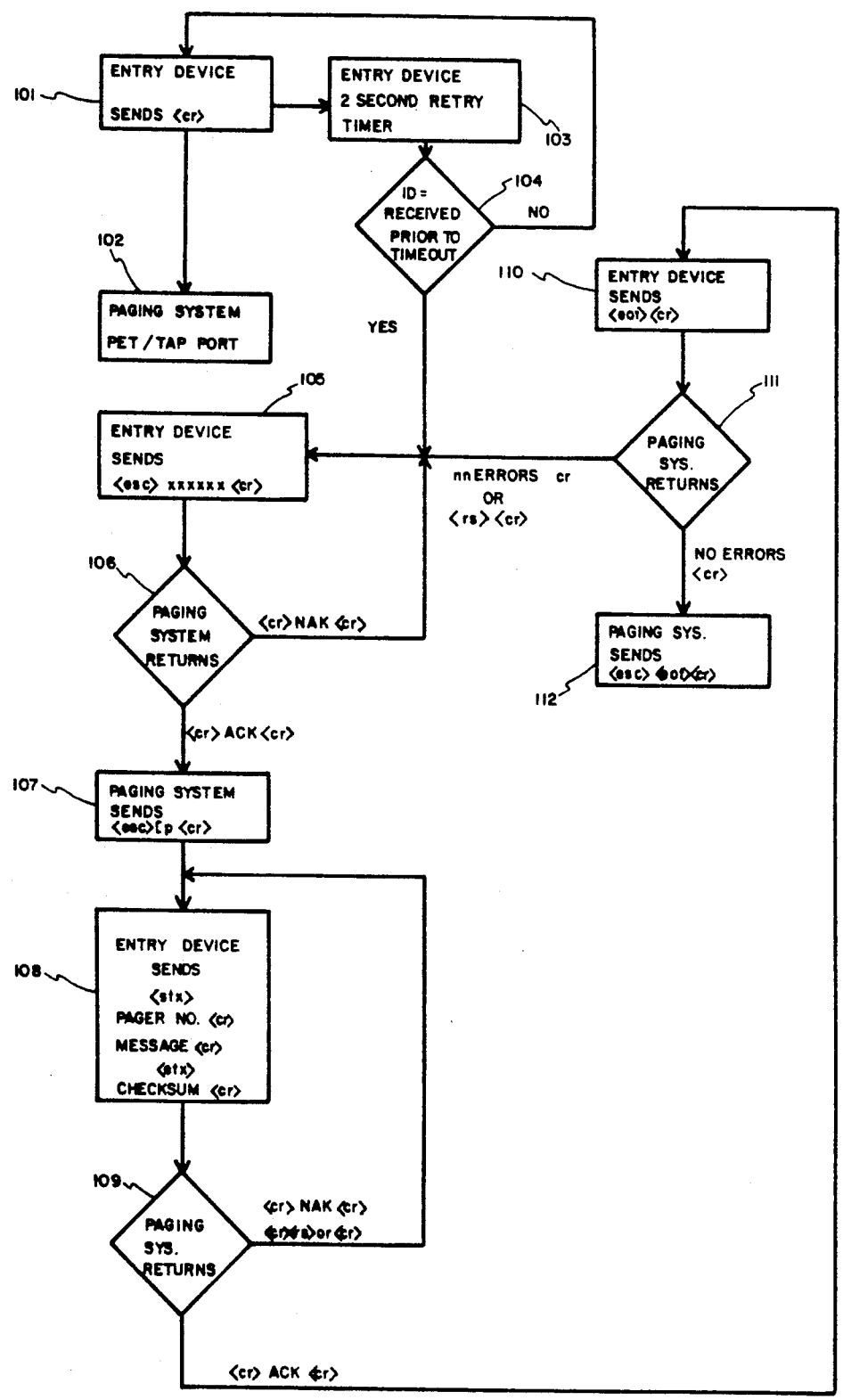
FIG. 5 shows a flow chart of the PET/TAP protocol used by the invention to communicate page data to the PET/TAP port of a paging system.
Figure 6:
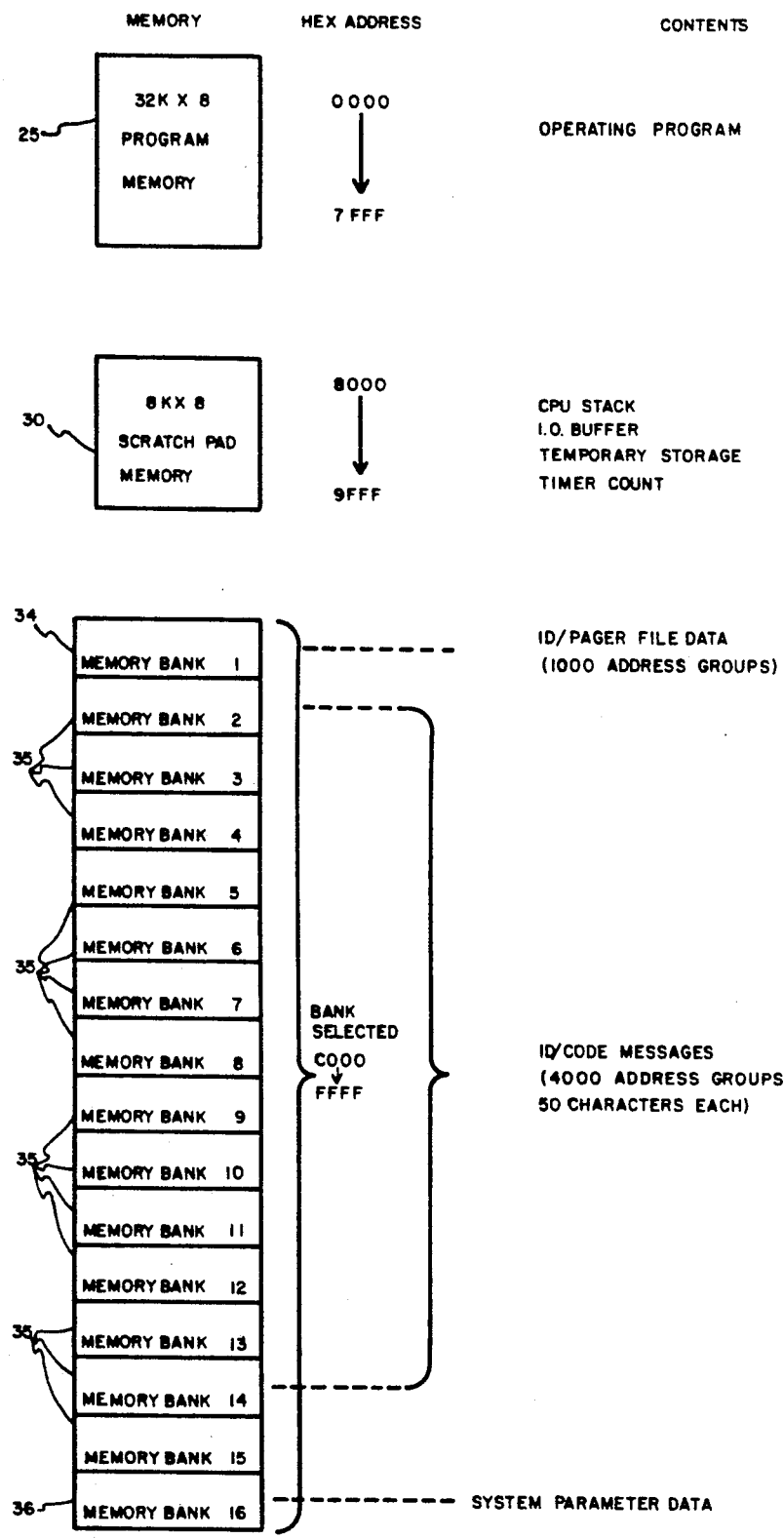
FIG. 6 shows the basic program EPROM, scratch and page data memory organization used in the invention.

FIG. 2 shows the circuit flow and FIGS. 3 and 4 show the process flow of the invention. The RS232 level data is converted to 5 volt logic data by line receiver 19 (DS1489) level converter (National Semiconductor or equivalent). The data is sent by conductor 20 to the alarm input serial USART 21, which is one half of the SIO/0 dual USART (Zilog or equivalent). Upon receipt of a character, the USART 21 pulls the Interrupt line 22 step 60 to the microprocessor 23 low and outputs an address vector on the external data bus 24. The microprocessor 23 is instructed by program 25 to read the vector step 61 through bus transceiver 26 to the internal bus 27 to determine the source of the interrupt. The program 25 (32Kx8 TI27C256 or equivalent EPROM) instructs the microprocessor 23 to perform an I. O. read through read decode circuit 32 (74HCT138 National Semiconductor or equivalent) and address bus 29. The incoming alarm ID and code characters are read through USART 21 step 62 to the external bus 24, through bus transceiver 26 (74HCT245 National Semiconductor or equivalent) to internal bus 27 and written into scratch memory 30 (8K×8 Hatachi 6264 or equivalent) step 63. Upon completion of reading all ID and code characters and storing them in scratch memory 30, the program 25 instructs the microprocessor 23, hence forth referred to as MPU, to use the ID digits to address bank select page data memory 31 step 64. The MPU 23 addresses 29 and writes 32 (74HCT138) to the memory bank select circuit 33, which selects one of sixteen sectors 34 of the page data memory 31 (two 128K×8 RAMs Hatachi HM628128 or equivalent). The first addressing sequence reads the ID FILE page data, which consists of a four digit account number (numeric only), a seven digit pager number (numeric only), a single digit function code (Hex), and a four digit call count (numeric only 0000-9999). The data from the ID FILE is written to temporary storage memory 30 step 65.

The following is a brief explanation of the ID FILE contents; The four digit account number is useful for assisting the system operator in identifying a subscriber associated with a specific alarm ID. The seven digit pager number may be programmed using two to seven digits which correspond to a pager number programmed in the paging system. The function code is used to determine if the address contents are valid and if a time stamp is to be appended to the message (0=invalid, 1=time stamp, 2=no time stamp). The call count number of times that an alarm ID has been received. The call count is incremented by one each time the ID is received.

After reading the correlating ID FILE data, the MPU 23 examines the function code to determine if the ID FILE address contents are valid step 66 and if a time stamp is to be appended to the page message. If the function code is=0 the call is invalid and the process is aborted and all associated ID and code data are cleared from scratch memory 30 step 67. If the function code is=1 or 2 the call is valid and the MPU is instructed to begin a second memory access of the page data memory 31. The combination of the ID and alarm code are used to address memory banks two through fourteen 35 until the correlating address group is located step 68. This address group is the message file associated with a particular ID/code combination. The ASCII text message in this address group is read and copied to scratch memory 30 step 69. The MPU 23 is next instructed to read memory bank sixteen 35 in the page data memory 31 step 70. This memory section contains the system parameter data programmed by the system operator. The data in this memory group contains the following information; direct connect/modem connect, paging system PET/TAP port telephone number and baud rate, and PET/TAP port six character password. The parameter data is written into scratch memory 30 step 71. If time stamp is indicated step 72 the MPU 23 is instructed to perform I.O. read 32 to read the clock/calender 36. The time data is read step 73 on bus 24 through bus transceiver 26 to bus 27 and written to scratch memory 30 step 74. The MPU is next instructed to perform I.O. write 28 to the time 37 (Intel 8253 or equivalent) to set time clock 0 output to 1200 hz step 76 (1200 baud rate clock for printer). The timer 37 is fed by system clock 38 (4 mhz) 39. The timer 37 counter 0 is set to divide the 4 mhz by 3333 to obtain the 1200 hz rate. The MPU is next instructed to initialize the print USART 40 step 77 with preset program specs of one start bit, 8 bits, one stop bit, no parity. The MPU next organizes the ID/code, page data and time (if selected) in print format (ID/code CR LF, pager number CR LF, time)(24 hr. format hh:mm) CR LF, and message CR LF. The MPU checks the busy status of the external printer step 78 (DTR) to determine if data can be sent to the printer. If the printer is not busy the MPU is instructed to send the ID/code, page data, and time (if selected) and message to the print USART 40. The data is sent to the printer 91 step 79 from USART 40 through conductor 53 to RS232 level converter 54. The X on/off protocol is supported through receive level converter 55 over conductor 56 to USART 40. The MPU selects either direct connect or modem connect step 75 based on system parameter data in scratch memory 30. If modem connect is selected the MPU initializes the PET/TAP USART 41 using DC Hayes protocol step 80. The PET/TAP USART 41 using DC Hayes protocol step 80. The PET/TAP USART 41 is set for preprogrammed data 25 structure of one start bit, 7 bits, one stop bit and even parity. The MPU performs I.O. write 28 to time 37 counter 1 to set the PET/TAP baud clock for the value indicated in the system parameter data stored in scratch memory 30 (1=300 baud, 2=1200 baud) step 81. The 4 mhz system clock 39 is divided by time 37 counter 1 (divide by 3333=1200, or divide by 13333=300 baud). The MPU issues the DC Hayes dial command ATD followed by the paging system PET/TAP telephone number stored in scratch memory 30 step 82 to modem 92. The MPU awaits carrier detect from the paging system modem step 83. If no carrier detect is received within forty-five seconds the modem is commanded through USART 41 to go on hook step 84 and the call is redialed. If the carrier detect is received the PET/TAP protocol is started. In the case of direct connect, USART 41 is initialized without DC Hayes protocol and the PET/TAP protocol is started step 85.

In the full duplex operation used in the PET/TAP protocol, the Protocol Converter is the entry device and transmits data from USART 41 through conductor 42 to RS232 driver 43 which converts the logic level data to RS232 levels 4 transmittal to either an external modem or RS232 PET/TAP port on a paging system 93. The Protocol Converter receives response data through level converter 45 which converts RS232 receive data to logic level and the data is sent to USART 41 on conductor 46.

FIG. 4 shows the PET/TAP protocol process. The Protocol converter sends CR step 101 to the paging system PET/TAP port step 102 and starts a two second "retry" timer step 103. If the paging system does not respond before the two second timeout step 104, the Protocol Converter sends CR again. This process is continued until ID is returned by the paging system or six successive CR transmissions are not answered. If the paging system fails to respond after the sixth CR timeout the page call is aborted and no further attempts are made for the page. If ID =is returned by the paging system the Protocol Converter sends ESC xxxxxx CR (xxxxxx=password in system parameter data) step 105. If the paging system responds with CR NAK CR the ESC xxxxxx CR step 105 sequence is retransmitted. When the paging system responds with CR ACK CR step 106 the Protocol Converter awaits the paging system to send ESC p CR step 107. When this response is received by the Protocol Converter the Protocol Converter sends STX pager number CR message CR ETX checksum CR step 108. The pager number in this transmission is the two to seven digit Pager number stored in scratch memory 30 and the message is the ASCII time (if selected) and page message stored in scratch memory 30. The checksum is the arithmetic sum of all of the seven bit words starting with STX through and including ETX. The checksum is sent as three ASCII characters which are derived from the least significant twelve bits of the sum. If the paging system responds with CR ACK CR step 109 the Protocol Converter sends EOT CR (end of transmission) step 110. The paging system may respond with nnErrors CR, RS CR, or No Errors CR step 111. If nnErrors CR or RS CR is returned the Protocol Converter starts the block transmission over at the ESC xxxxxx CR point. If the paging system returns No Errors CR the Protocol Converter disconnects and the paging system disconnects step 112.

Once the PET/TAP transmission block has been successfully sent to the paging system it is the function of the paging system to signal the pager or pagers designated and to send the alphanumeric message to them. The PET/TAP alphanumeric protocol was specifically designed to permit automatic page entry to digital alphanumeric pages. The paging system signals this type of pager using NRZ (non-return to zero) binary data transmission in either POCSAG or golay binary error correcting formats. The Protocol Converter continues to receive incoming calls in security tone signaling protocol and to convert these alarm messages into a pager number and message to be sent to the paging system using the PET/TAP protocol.

The Protocol Converter is accessed for programming of page data, messages, and system parameter data through a full duplex serial RS232 port 47. The port is programmed either locally or remotely via modem using an MSDOS IBM XT or AT compatible computer 90 with communications software. Incoming characters from the PC are processed at RS232 levels and converted to logic level through converter 48 (DS1489) and sent via conductor 49 to Programming USART 50. Transmitted data from USART 50 cause an interrupt 22 to the MPU 23. The MPU reads the incoming characters on external bus 24, through bus transceiver 26 and onto bus 27 where the characters are written to scratch memory 30. The MPU compares the received characters to five preprogrammed password characters in program memory 25.

If all characters match in sequence the MPU is instructed to send a system menu based on program memory data 25 through USART 50 and level converter 52 to the PC.

The menu options include; 1=ID FILE, 2=MESSAGE FILE, 3=SYSTEM PARAMETERS, 4=LIST ACTIVE ACCNTS .. The ID FILES option permits the operator programming or review access to the page data ID FILE which contains a four digit account number, a pager number field to accommodate up to a seven digit pager number, a function code, and a four digit call count. ID FILE addresses are numbered 000 to 999 and correlate to an incoming alarm ID code. The four digit account number is an arbitrary four digit field used to tie a specific ID page data address to a specific subscriber. The pager number field is programmed as a two to seven digit number which correlates to the page number assigned in the paging system. The function code defines whether the ID address data for a specific ID call is valid and if the page is to be time stamped. The call count field is a four digit number that indicates the number of time that the ID address has been accessed by an incoming alarm call. The MESSAGE FILE is structured as four thousand separate addresses which correlate to a combination ID/Alarm code. Each message address is allocated memory capacity to hold up to fifty ASCII characters. The ASCII message in each message address is tagged to an incoming ID/Alarm code combination, and is the alphanumeric message transmitted during the PET/TAP communication.

What is claimed is:

1. An automatic alarm system in which a plurality of remote alarm signal generators, each adapted for providing unique ID signal for identifying the alarm signal generator and at last one unique alarm signal for identifying a predetermined alarm condition and encoding the said ID and alarm signals in a first protocol are connected by a first communication system to a central site which receives the signals from the first communication system and retransmits them in a second protocol to one or more remote receiving stations via a second communication system comprising:

a decoder connected to the said first communication system for receiving signals supplied by said alarm signal generator;

memory means for storing routing information specific to each of the remote receiving stations and alphanumeric messages corresponding to each of the predetermined alarm conditions;

first means connected to the said memory means and responsive to the ID signal identifying the source of the alarm message for selecting routing information stored in the memory and responsive to the said received alarm signal for selecting an alphanumeric message corresponding thereto;

second means responsive to the first means for formatting the routing information and the alphanumeric message in the said second protocol; and, third means responsive to the second means for transmitting the formatted routing information and alphanumeric message over the said second communication system to the remote receiving station.

2. An automatic alarm system as set forth in claim 1 in which the alarm signals received by the decoder are converted to ASCII data for processing.

3. An automatic alarm system as set forth in claim 1 in which the second means formats the routing information and the message in PET/TAP protocol 4. An automatic alarm system as set forth in claim 1 in which the alarm signals received by the decoder are converted to ASCII data for processing and the second means formats the routing information and the message in PET/TAP protocol.

* * * * *